United States Patent [19]

Shelton

[11] 4,343,067
[45] Aug. 10, 1982

[54] MEAT CUTLET TENDERIZING MACHINE

[75] Inventor: Charles L. Shelton, Garland, Tex.

[73] Assignee: Quik-to-Fix Products, Inc., Garland, Tex.

[21] Appl. No.: 152,662

[22] Filed: May 23, 1980

[51] Int. Cl.³ .............................................. A22C 9/00
[52] U.S. Cl. ........................................................ 17/26
[58] Field of Search .............................. 17/26, 25, 52

[56] References Cited

U.S. PATENT DOCUMENTS

| | | | |
|---|---|---|---|
| 434,238 | 8/1890 | Bischoff | 17/26 |
| 880,589 | 3/1908 | Snelling | 17/26 |
| 1,126,621 | 1/1915 | De Back | 17/26 UX |
| 1,919,964 | 7/1933 | Spang | 17/26 |
| 2,279,071 | 4/1942 | Spang | 17/26 |
| 2,457,622 | 12/1948 | Ahrndt | 17/26 |
| 2,564,651 | 8/1951 | Spang | 17/26 |
| 2,606,341 | 8/1952 | Dolan | 17/26 |
| 2,704,858 | 3/1955 | Deckert | 17/26 |
| 2,886,845 | 5/1959 | Byland et al. | 17/26 |
| 3,347,679 | 10/1967 | Nordin | 17/26 |
| 3,823,441 | 7/1974 | Bridge, Jr. | 17/26 |

*Primary Examiner*—Willie G. Abercrombie

*Attorney, Agent, or Firm*—Hubbard, Thurman, Turner, Tucker & Glaser

[57] ABSTRACT

A meat cutlet tenderizing machine having first and second sets of coacting roller cutters between which a meat cutlet is fed is disclosed. The coacting roller cutters of each set are arranged in parallel pairs with rotary tenderizing knives mounted in axially spaced relation on each roller cutter. The second set of roller cutters are vertically spaced with respect to the roller cutters of the first set to permit a meat cutlet to be engaged and perforated simultaneously by the rotary tenderizing knives of both first and second sets as the meat cutlet advances through the coacting roller cutter pairs. The coacting roller cutters are driven by a chain and sprocket assembly in which the drive sprocket coupled to the roller cutters of the second set has a greater number of sprocket teeth than the drive sprocket coupled to the roller cutters of the first set thereby causing the rotary tenderizing knives of the second set to rotate at a faster rate relative to the rotary tenderizing knives of the first set. The meat cutlet is stretched and perforated simultaneously as it advances through the coacting roller cutter sets because of the differential rotation.

3 Claims, 6 Drawing Figures

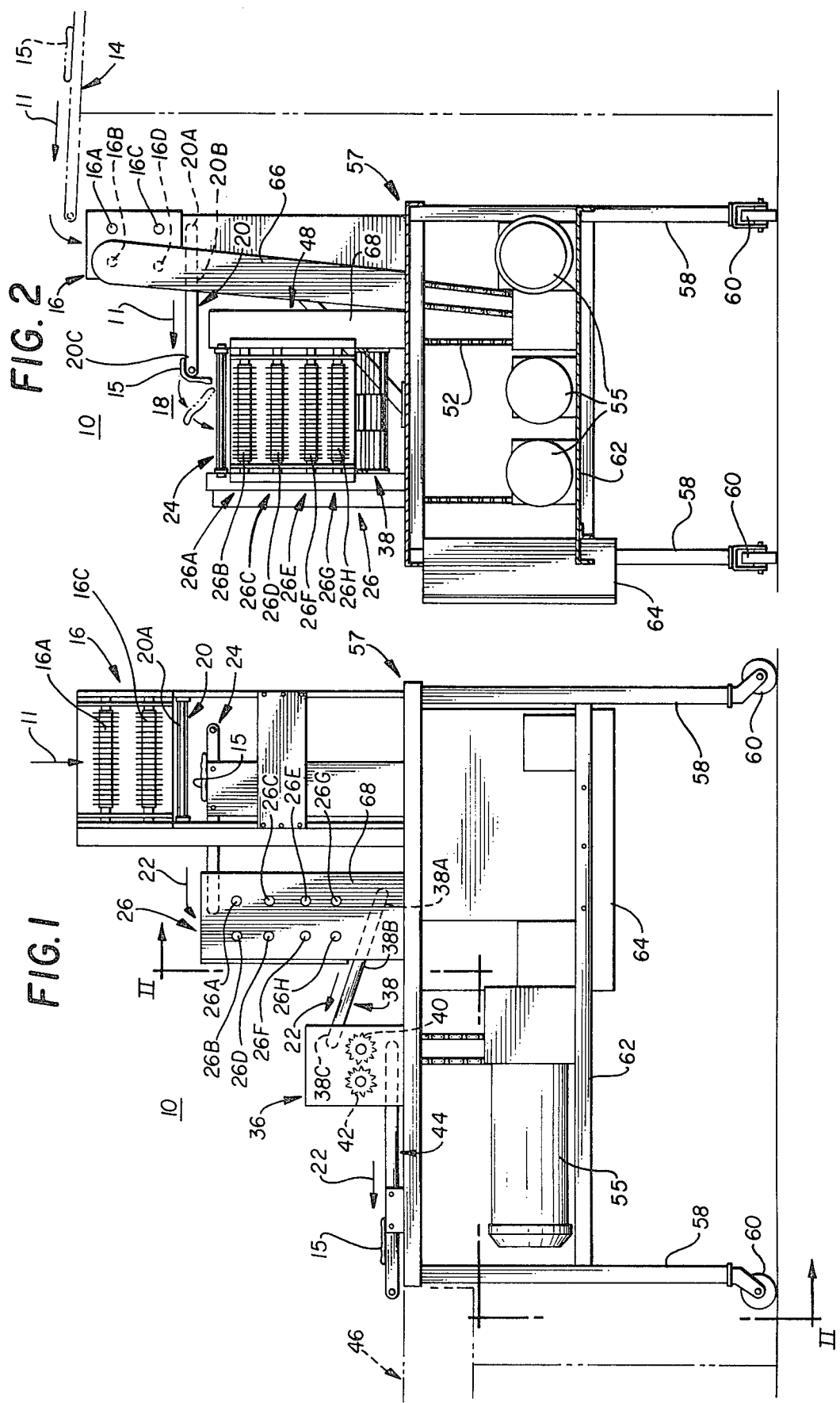

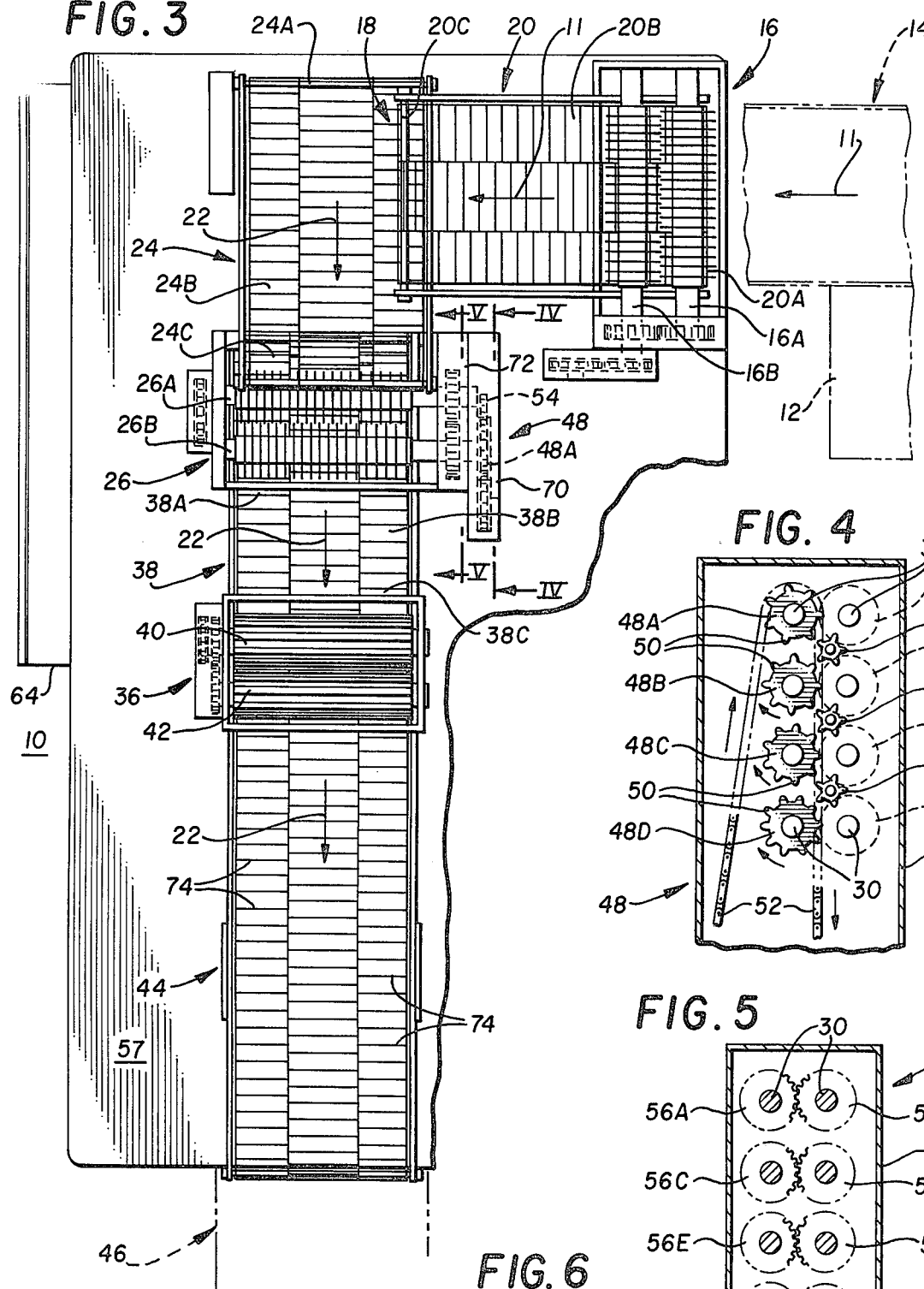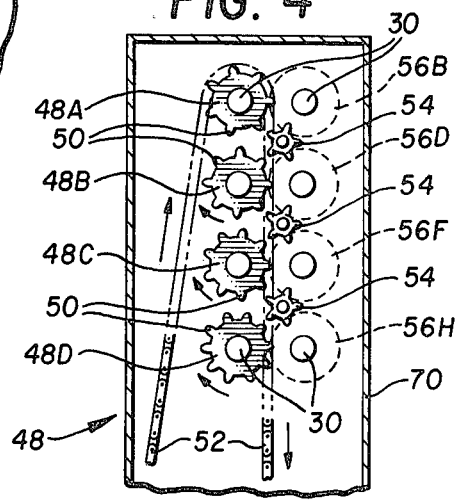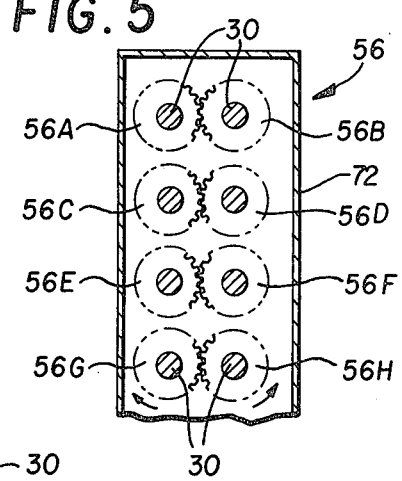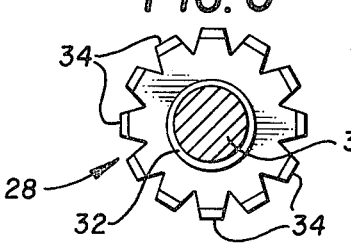

MEAT CUTLET TENDERIZING MACHINE

BACKGROUND OF THE INVENTION

1. Field of the Invention

This invention relates to food processing apparatus and in particular to a meat tenderizing machine having coacting roller cutters for tenderizing meat cutlets.

2. Description of the Prior Art

Breaded veal and steak cutlets of the type typically served in restaurants and cafeterias comprise meat cutlets which have undergone tenderizing and breading operations prior to cooking. The tenderizing and breading may be carried out on the premises of the cafeteria or restaurant but in most establishments bulk quantities of the breaded cutlets are provided by a food processing vendor according to certain specifications regarding meat portion size and breading constituency.

According to conventional methods, tenderizing of meat cutlets is carried out in a machine which has a pair of roller cutters provided with teeth or knives for severing the connective tissues and striations. The meat cutlet is fed between the roller cutters and after discharge from the cutters is turned 90° and is fed through the roller cutters again. This procedure may be repeated to achieve the desired degree of tenderizing. This manual operation is quite slow and requires the attention of an operator for the turning step. The effectiveness of bulk tenderizing operations involving multiple operators and multiple tenderizing units has been limited by the increasing capital expenditures for individually operated tenderizing machines and by rapidly increasing labor costs. Although a single meat tenderizing machine and operator may be economically competitive in a low volume operation, food processing vendors who supply bulk quantities of tenderized cutlets require automatic tenderizing equipment capable of high volume production with minimum supervision and maintenance.

Because of the tendency of the cutlet to shrink during cooking, it is desirable during the tenderizing procedure to flatten out the cutlet and increase its surface area as much as possible prior to performing the breading step. According to conventional methods, the cutlet is pressed and squeezed as it is fed through closely spaced rollers to obtain the desired increase in surface area. This is usually carried out by successive squeezing and pressing operations in separate roller apparatus which increases the processing time and in some cases limits the rate at which cutlets can be fed through the roller cutters.

Therefore there is a continuing interest in providing apparatus which is capable of efficient bulk processing of meat cutlets in which the tenderizing and surface area expansion procedures are carried out effectively and efficiently.

SUMMARY OF THE INVENTION

It is therefore a principal object of the present invention to provide apparatus which is capable of processing bulk quantities of meat cutlets effectively and efficiently by simultaneously perforating and stretching each meat cutlet to sever connective tissues and to increase the surface area of the cutlet automatically in a single operation.

A further object of the invention is to provide a meat tenderizing machine which is capable of simultaneously tenderizing a meat cutlet on opposite faces in a first direction, inverting and rotating the cutlet and thereafter tenderizing the meat cutlet on opposite faces in parallel lines which extend transversely with respect to the tenderizing lines of the first operation.

Yet another object of the invention is to provide meat tenderizing apparatus which simultaneously perforates and stretches the meat cutlet by the engagement of cutter knives which are rotated at relatively different rates with respect to each other.

It is yet another object of the present invention to provide an improved meat tenderizing machine which may be quickly and easily dismantled and having all parts easily accessible to permit steam cleaning and maintenance operations to be carried out expediently.

In accordance with the principles of the present invention, a meat tenderizing machine which achieves the foregoing objects is characterized by a vertically stacked array of coacting pairs of rollers having radially projecting tenderizing elements for engagement with opposite faces of a meat cutlet with the coacting roller pairs being disposed in spaced relation to each other permitting the meat cutlet to be engaged simultaneously by the tenderizing elements of adjacent pairs of coacting roller cutters. Drive means are coupled to the rollers for simultaneously rotating the rollers of each pair at a rotational speed which is greater than the rotational speed of the rollers in the immediately preceding pair relative to the direction of feeding movement through the stacked array.

According to another important feature of the invention, tenderizing of a meat cutlet is carried out by perforating the cutlet at spaced intervals along parallel lines on opposite faces of the cutlet as it advances through a first processing station, and inverting and rotating the cutlet prior to feeding it through a second processing station where it is tenderized by penetrating the cutlet at spaced intervals along parallel lines which extend transversely with respect to the perforations formed at the first processing station. In a preferred embodiment, the cutlet is stretched in a first direction parallel to the lines of perforation produced in the first processing station by passing the cutlet through first and second sets of coacting roller cutters. The coacting sets are spaced relative to each other to permit the cutlet to be engaged simultaneously by the cutter elements of both sets. The rollers of the second set are rotated at a faster rate than the rollers of the first set so that the cutlet is stretched as tension is applied to the cutlet portion lying intermediate the differentially rotating roller cutters of each set.

The foregoing and other objects, advantages and features of the invention will hereinafter appear, and for purposes of illustration, but not of limitation, an exemplary embodiment of the subject invention is shown in the appended drawings.

BRIEF DESCRIPTION OF THE DRAWINGS

FIG. 1 is a side elevation view of a meat tenderizing machine constructed according to the teachings of the present invention which is capable of processing bulk quantities of meat cutlets;

FIG. 2 is an elevation view, partly in section, of the meat tenderizing machine shown in FIG. 1 taken along the lines II—II;

FIG. 3 is a top plan view of the meat tenderizing machine shown in FIG. 1;

FIG. 4 is a side elevation view, partly in section, of a chain and sprocket drive assembly taken along the lines IV—IV of FIG. 3;

FIG. 5 is an elevation view, partly in section, of a gear drive assembly taken along the lines V—V of FIG. 3; and FIG. 6 is an elevation view, partly in section, of a rotating cutter knife taken along the lines VI—VI of FIG. 3.

DETAILED DESCRIPTION OF THE PREFERRED EMBODIMENTS

In the description which follows, like parts are marked throughout the specification and the various drawing figures with the same reference numerals, respectively. The drawing figures are not necessarily to scale and in some instances portions have been exaggerated in order to more clearly depict certain features of the invention.

Referring now to the drawing, and in particular to FIGS. 1, 2 and 3 thereof, a meat tenderizing machine 10 incorporating the principles of the invention is organized in a series of processing stations which are linked together by continuous conveyor belts. As can best be seen in FIG. 3, the meat tenderizing machine 10 includes a loading station 12 which may be, for example, an upstanding table placed adjacent a first conveyor 14 in any convenient arrangement which will permit bulk quantities of meat cutlets 15 to be manually loaded onto the conveyor 14 for transportation and delivery to a tenderizing station 16.

After being tenderized in the first tenderizing station 16, the meat cutlets are transported to an inverting station 18 by means of a second conveyor 20. The second conveyor 20 has a loading end 20A disposed below and adjacent the first tenderizing station 16 for receiving the meat cutlets 15 as they are discharged therefrom, an intermediate transporting section 20B and a delivery end 20C for transporting the meat cutlets 15 in the first direction of feeding movement as indicated by the arrows 11. After undergoing inversion and rotation, the meat cutlets 15 are conveyed along a second direction of feeding movement as indicated by the arrows 22 on a third conveyor 24 which is oriented transversely with respect to the first and second conveyors, preferably by 90°. The third conveyor assembly has a loading end 24A disposed in the inverting station 18 at a lower elevation relative to the delivery end 20C of the second conveyor assembly 20 to permit free fall and rotational inversion of the cutlet 15 so that it is delivered in an upside down position onto the third conveyor assembly 24. After undergoing inversion and rotation, the cutlets 15 are transported to a second tenderizing station 26.

According to a preferred embodiment of the invention, the tenderizing stations 16, 26 include a vertically stacked array of coacting pairs of roller cutters 16A, 16B and 16C, 16D, and 26A, 26B, 26C, 26D, 26E, 26F, 26G and 26H, respectively. The rollers cutters are identically constructed according to a typical arrangement as shown in FIGS. 3 and 6. Each roller cutter, for example the roller cutter 16A, includes a plurality of cutter discs 28 secured to a roller shaft 30 by means of a retainer ring and spacer assembly 32. A plurality of cutter knife tips 34 are formed around the periphery of the cutter disc 28.

The tenderizing cutter discs 28 project radially with respect to the roller shaft 30 for engagement with opposite faces of the meat cutlet 15 so that each meat cutlet is perforated along spaced parallel lines by the knife tips 34 as it passes through the coacting rollers. Since the cutter discs 28 are disposed in parallel relation with the direction of first feeding movement 11, it will be seen that the cutlets are tenderized and perforated at spaced intervals along lines which are parallel with respect to the first direction of feeding movement 11. The cutlets 15 are rotated and inverted in the inverting station 18 so that as they pass through the second tenderizing station 26, they undergo perforation and tenderizing along spaced parallel lines which are parallel with the second direction of feeding movement 22. Since the second direction 22 of feeding movement is substantially at right angles with respect to the first direction 11 of feeding movement, the cutlet is tenderized on its opposite faces along two sets of parallel lines which are mutually perpendicular thereby assuring maximum tenderizing effect.

After being discharged from the second tenderizing station 26, the cutlets are transported to a spreader station 36 by means of a fourth conveyor assembly 38 having a loading end 38A disposed below the coacting roller cutters of the second tenderizing station 26, an intermediate transporting section 38B and a delivery end 38C for discharging cutlets into the spreader station 36. The spreader station 36 includes a pair of coacting spreader rollers 40, 42 which are closely spaced to squeeze and spread each cutlet to increase its surface area. The rollers 40, 42 preferably comprise nylon cylinders. After undergoing spreading, the cutlets are transported over a fifth conveyor assembly 44 to a breading station 46 where they undergo breading according to conventional procedures.

According to an important feature of the invention, each cutlet 15 is stretched as it undergoes perforation by the roller cutter knife tips 34. This stretching action is carried out by causing the roller cutters of each roller cutter pair to rotate at a speed which is greater than the rotational speed of the roller cutters in the immediately preceding pair relative to the direction of feeding movement through the stacked array. Because the cutting elements of the rollers in the succeeding roller pairs are turning faster than the cutting elements of the preceding roller pairs, tension is applied to the meat cutlet as it is engaged simultaneously by the cutter knife tips 34 of roller cutters in both first and second sets as the cutlet advances through the coacting cutters. The cutlet stretches in the direction of feeding movement at the same time as penetration occurs and some slight elongation of the slit produced by the cutter knife tip also occurs. Thus the cutlet is stretched and elongated along lines parallel to the first direction of feeding movement in the first tenderizing station and then is subsequently stretched in a direction perpendicular to the first direction as it passes through the second tenderizing station. These successive stretching operations tend to increase the surface area of the cutlet while at the same time cause some tenderizing effect as minute connective tissues are pulled apart in response to the tension forces which are applied during stretching.

Differential rotation of successive coacting roller cutter pairs may be provided in a number of ways. The arrangement shown in FIG. 4 is preferred and includes a stacked array 48 of sprocket gears 48A, 48B, 48C and 48D which are coupled to the roller shaft 30 of each of the roller cutter assemblies. In FIG. 4, it will be seen that each of the sprocket gears 48A–48D has an increasing number of sprocket teeth 50. For example, the sprocket gear 48A has seven sprocket teeth 50, sprocket gear 48B has eight sprocket teeth, sprocket gear 48C has nine sprocket teeth and sprocket gear 48D has ten sprocket teeth. Each sprocket gear 48A–48D is coupled to a drive chain 52 which is driven by an electric motor 54 at a constant speed. However, because each successive sprocket gear has an increasingly greater number of sprocket teeth, each successive sprocket gear is driven at a proportionally faster rotation rate. Idler sprockets 54 hold the drive chain 52 into engagement with the sprocket teeth 50 of each sprocket gear.

Differential rotation is provided by the increasing number of teeth on each sprocket gear. Adjacent roller cutters in each pair are driven in opposite rotational directions by means of a second set 56 of sprocket gears 56A, 56B, 56C, 56D, 56E, 56F, and 56G, 56H as shown in FIG. 5. Each of these drive gears preferably has the same number of teeth so that each cutter pair rotates at the same rotational speed but in opposite directions. This causes the roller cutters of each pair to rotate in opposite directions so that opposite faces of each meat cutlet are perforated along parallel lines as the cutlet is advanced through the stacked array. For proper stretching action, the coacting roller cutter pairs in each stacked array should be spaced relative to each other thereby permitting separate portions of each meat cutlet to be engaged simultaneously by the tenderizing elements of any two adjacent coacting roller pairs. Each stacked array of roller cutters are preferably vertically disposed so that movement through each roller cutter pair is assisted by the force of gravity. This vertical open arrangement of roller cutters provides easy access for maintenance and also permits sterilization by steam cleaning procedures.

Referring again to FIG. 3, the processing stations and conveyors are disposed at different elevations in a right angle arrangement which provides inversion and rotation of each meat cutlet in the inverting station. Although inversion of each cutlet is not essential to the tenderizing procedure, it permits visual inspection of both sides of each meat cutlet for quality control.

In FIGS. 1 and 2, the processing stations and conveyors are shown mounted on a work table 57 which is supported by upstanding support legs 58 and which is movable on swivel casters 60. The work table 57 preferably includes an intermediate support shelf 62 on which the electrical drive motors 54 and a control panel 64 are located. The drive chains for the first tenderizing station and for the second tenderizing station are preferably enclosed within shrouds 66, 68 respectively. The sprocket gear assembly 48 and drive gear assembly 56 are preferably enclosed by a shroud or panel enclosure 70, 72, respectively. The conveyor assemblies can be of any desired type capable of sterilization but preferably are of the well known link construction having a plurality of transverse panel segments 74 connected on pivots or hinges to provide flexibility.

Although a preferred number of sprocket gear teeth 50 have been shown on each of the sprocket gears 48A–48D, it should be understood that other sprocket teeth number combinations may be used to good advantage. It has been determined that the best stretching action is obtained when the rotational speed of the roller cutters increases over a range of about 20%. The particular number of teeth illustrated in FIG. 4 is only one means for obtaining a desired range of differential rotation.

Therefore it will be apparent that the meat tenderizing machine of the present invention provides substantial advantages over conventional tenderizing apparatus and is designed to speed up the tenderizing and processing of bulk quantities of meat cutlets. The meat tenderizing apparatus of the present invention requires a minimum amount of floor space, produces high quality, uniformly tenderized cutlets and facilitates rapid maintenance and sterilizing. Additionally, the entire system provides an improved method of bulk food processing that increases output, reduces the requirement for extensive operator training, reduces operator labor and improves product quality.

Although a preferred embodiment of the invention has been described in detail, it should be understood that various changes, substitutions and alterations can be made therein without departing from the spirit and scope of the invention as defined by the appended claims.

What is claimed is:

1. Meat tenderizing apparatus comprising, in combination:

a loading station;

a first processing station;

a first conveyor assembly having a loading end, an intermediate transporting section and a delivery end for transporting meat cutlets in a first direction of feeding movement from said loading station to said first processing station;

a first array of coacting rollers disposed below and adjacent the first conveyor assembly in the first processing station and extending across the delivery end of the first conveyor assembly for receiving cutlets, said coacting rollers having radially projecting tenderizing elements for engaging opposite faces of the cutlet and tenderizing the cutlet along parallel lines;

an inverting station;

a second conveyor assembly having a loading end disposed below and adjacent said first array of coacting rollers for receiving cutlets as they are discharged from said coacting rollers, an intermediate transporting section and a delivery end for transporting cutlets in said first direction of feeding movement to the inverting station;

a second processing station;

a third conveyor assembly extending in a second direction of feeding movement transversely with respect to the first direction of feeding movement, said third conveyor having a loading end, a delivery end and an intermediate section for transporting cutlets from the inverting station to said second processing station, the loading end of said third conveyor assembly being disposed in the inverting station at a lower elevation relative to the delivery end of the second conveyor assembly to permit free fall and rotational inversion of said cutlet so that it is delivered in upside down position onto said third conveyor assembly;

a second array of coacting rollers disposed below and adjacent the third conveyor assembly in the second processing station and extending across the delivery end of the third conveyor assembly for receiving the inverted cutlets, said coacting rollers having radially projecting tenderizing elements for engaging opposite faces of the inverted cutlets and tenderizing the cutlets along parallel lines which extend transversely with respect to the parallel tenderizing lines produced in the first processing station;

a delivery station; and a fourth conveyor assembly having a loading end disposed below the coacting rollers of the second array for receiving the cutlets as they are discharged from said coacting rollers, an intermediate transporting section and a delivery end for transporting cutlets in said second direction of feeding movement to the delivery station.

2. The meat tenderizing apparatus as defined in claim 1, said first array including first and second sets of coacting rollers between which the meat cutlets are successively fed, respectively, and said first and second sets of coacting rollers being disposed in spaced relation to each other to permit portions of a meat cutlet to be engaged simultaneously by tenderizing elements of both first and second sets as the cutlet advances through said rollers, the combination including drive means coupled to the rollers of said first array to cause the rollers of the second set to rotate at a rate which is faster relative to the rotation rate of the rollers of the first set whereby the cutlet is stretched in a direction parallel to the lines of tenderizing engagement produced by the tenderizing elements of the first array as it moves through the coacting rollers in response to the differential rotation of the rollers of the second set relative to the rotation of the rollers of the first set.

3. The meat tenderizing apparatus as defined in claim 1, said second array including first and second sets of coacting rollers between which the meat cutlets are successively fed, respectively, and said first and second sets of coacting rollers being disposed in spaced relation to each other to permit portions of a meat cutlet to be engaged simultaneously by tenderizing elements of both first and second sets as the cutlet advances through said rollers, the combination including drive means coupled to the rollers of said second array to cause the rollers of the second set to rotate at a rate which is faster relative to the rotation rate of the rollers of the first set whereby the cutlet is stretched in a direction parallel to the lines of tenderizing engagement produced by the tenderizing elements of said second array as it moves through the coacting rollers in response to the differential rotation of the rollers of the second set relative to the rotation of the rollers of the first set.

* * * * *